(12) United States Patent  
Patel et al.

(10) Patent No.: US 8,107,360 B2
(45) Date of Patent: Jan. 31, 2012

(54) DYNAMIC ADDITION OF REDUNDANT NETWORK IN DISTRIBUTED SYSTEM COMMUNICATIONS

(75) Inventors: Atit D. Patel, Austin, TX (US); Michael J. Jones, Cedar Park, TX (US); Ajay K. Mahajan, Austin, TX (US); Iwan P. Sofjan, San Antonio, TX (US)

(73) Assignee: International Business Machines Corporation, Armonk, NY (US)

(*) Notice: Subject to any disclaimer, the term of this patent is extended or adjusted under 35 U.S.C. 154(b) by 163 days.

(21) Appl. No.: 12/409,230

(22) Filed: Mar. 23, 2009

(65) Prior Publication Data

US 2010/0241894 A1 Sep. 23, 2010

(51) Int. Cl.
*G06F 11/00* (2006.01)
*H04J 1/16* (2006.01)
*H04L 12/26* (2006.01)

(52) U.S. Cl. ......... 370/217; 370/219; 370/220; 370/225
(58) Field of Classification Search ........... 370/216–225
See application file for complete search history.

(56) References Cited

U.S. PATENT DOCUMENTS

| | | | |
|---|---|---|---|
| 5,016,244 A | 5/1991 | Massey, Jr. et al. | |
| 7,684,426 B2* | 3/2010 | Narvaez et al. | 370/419 |
| 7,688,712 B2* | 3/2010 | Glapin et al. | 370/216 |
| 2003/0048782 A1 | 3/2003 | Rogers et al. | |
| 2003/0095501 A1 | 5/2003 | Hofner et al. | |
| 2004/0190444 A1* | 9/2004 | Trudel et al. | 370/224 |
| 2005/0080933 A1* | 4/2005 | Herring | 709/249 |
| 2006/0015764 A1 | 1/2006 | Ocko et al. | |
| 2006/0062203 A1 | 3/2006 | Satapati | |
| 2007/0076590 A1 | 4/2007 | Galpin et al. | |
| 2008/0056142 A1 | 3/2008 | Arnold et al. | |
| 2008/0181226 A1 | 7/2008 | Varier et al. | |
| 2009/0129772 A1* | 5/2009 | Trudel et al. | 398/8 |
| 2010/0023595 A1* | 1/2010 | McMillian et al. | 709/212 |
| 2010/0061362 A1* | 3/2010 | Wang et al. | 370/350 |

* cited by examiner

Primary Examiner — Chuong T Ho
(74) Attorney, Agent, or Firm — DeLizio Gilliam, PLLC

(57) ABSTRACT

Disclosed is a computer implemented method and apparatus for establishing a redundant channel from an application to a peer data processing system. The interrupt-driven hot standby program receives, through the operation of a data processing system, a communication channel status corresponding to an application. The application has a first channel using local access across a first physical conduit to a first switch. In addition the communication channel status is, in part, an interrupt. The interrupt-driven hot standby program determines whether the redundant channel is present. The redundant channel is configured to use a second physical conduit distinct from the first physical conduit for traffic of the application. Responding to a determination that the redundant channel is present, the interrupt-driven hot standby program determines whether the redundant channel is configured to use the second physical conduit as local access to a redundant switch, wherein the redundant switch is not the first switch. The interrupt-driven hot standby program responds to a determination that the redundant channel is configured to use the second physical conduit by updating a communication channel list to include at least one attribute of the redundant channel, wherein the communication channel list is resident in the data processing system.

18 Claims, 5 Drawing Sheets

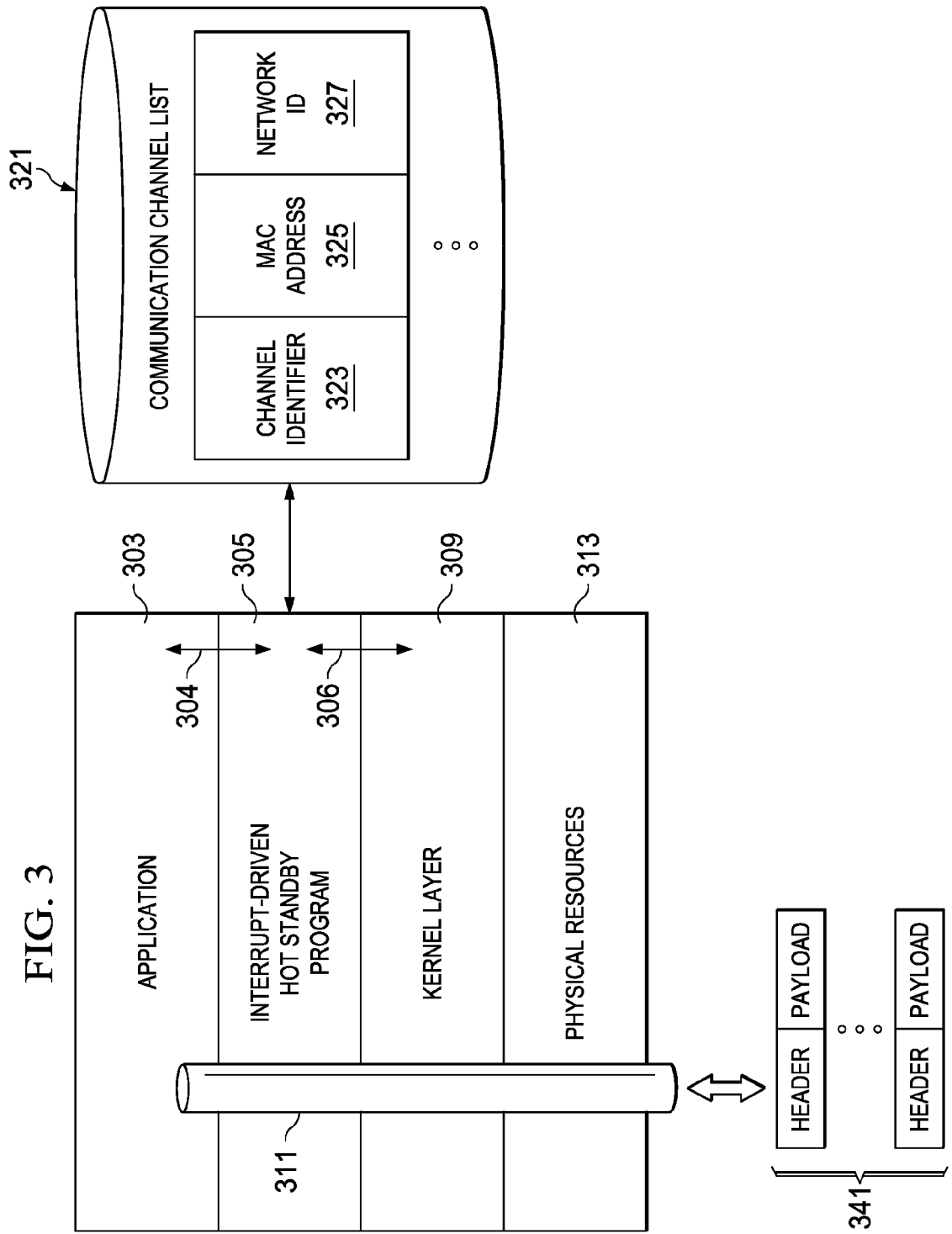

DYNAMIC ADDITION OF REDUNDANT NETWORK IN DISTRIBUTED SYSTEM COMMUNICATIONS

BACKGROUND OF THE INVENTION

1. Field of the Invention

The present invention relates generally to a computer implemented method, data processing system, and computer program product for networking two data processing systems together. More specifically, the present invention relates to establishing at least one redundant channel as well as failing-over from a channel experiencing problems to a redundant channel.

2. Description of the Related Art

Modern uses of networked computers leverage multiple data processing systems or device controllers to perform a task by dividing labor among the two or more controllers. Typically, the network that interconnects such data processing systems relies on one or more physical conduits to carry a signal between the data processing systems. A physical conduit is a cable that connects at least two endpoints so that an electromagnetic signal may pass therein. A physical conduit may include, for example, metallic conductors, fiber optics, coaxial cables, and waveguides, among others. In addition, some networks may rely on wireless signals to transport data via a medium between lithosphere and the ionosphere such that a signal leaves one data processing system and arrives at a second data processing system.

A challenge faced by network architects is maintaining reliable communication between devices in such networks. Occasionally, network architects provide a redundant path between two networked devices. However, a redundant path can have a single point of failure with a primary path. For example, a device may have only a single physical conduit by which it reaches a network. Accordingly, the single physical conduit can fail, and bring down communications on both the primary path as well as the redundant path.

To combat this risk, network architects can build a first physical conduit and a second physical conduit to allow a device to reach a network. These physical conduits may be arranged to be local access conduits. A local access conduit is a physical conduit that links a device directly to a peer device without any intervening switch or routing device between the device and its peer device. Given that a switch can be a peer device to a device, the local access conduit can connect the device to a switch.

Network architects can benefit from an apparatus that assists applications executing on differing devices to dynamically initiate session connectivity among them on newly inserted physical conduits. This capability would allow network architects to design scalable networks.

SUMMARY OF THE INVENTION

The present invention provides a computer implemented method and apparatus for establishing a redundant channel from an application to a peer data processing system. The interrupt-driven hot standby program receives, through the operation of a data processing system, a communication channel status corresponding to an application. The application has a first channel using local access across a first physical conduit to a first switch. In addition, the communication channel status is, in part, an interrupt. The interrupt-driven hot standby program may then determine whether the redundant channel is present. The redundant channel is configured to use a second physical conduit distinct from the first physical conduit for traffic of the application. Accordingly, the redundant channel is redundant with respect to the first channel. Responding to a determination that the redundant channel is present, the interrupt-driven hot standby program determines whether the redundant channel is configured to use the second physical conduit for access to a peer data processing system. The interrupt-driven hot standby program responds to a determination that the redundant channel is configured to use the second physical conduit by updating a communication channel list to include at least one attribute of the redundant channel, wherein the communication channel list is resident in the data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a software applications configured in accordance with an illustrative embodiment of the invention;

DETAILED DESCRIPTION OF THE PREFERRED EMBODIMENT

Figure 1A:
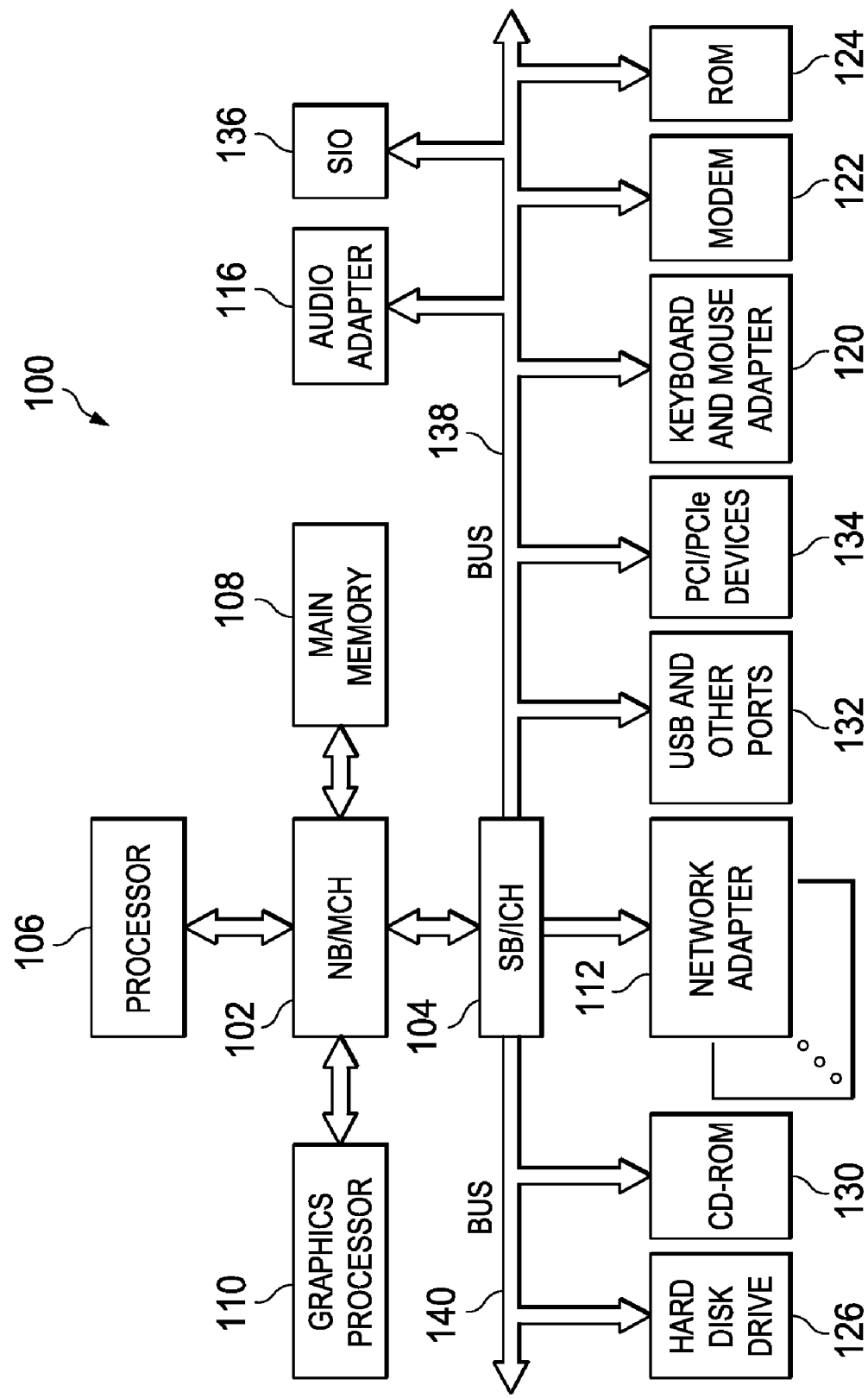
FIG. 1A is a data processing system in accordance with an illustrative embodiment of the invention.

With reference now to the figures and in particular with reference to FIG. 1A, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, network adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. Network adapter 114 may be one of several network adapters that serve the data processing system. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1A. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1A may vary depending on the implementation. Other internal hardware or peripheral devices, such as flash memory, equivalent non-volatile memory, and the like, may be used in addition to or in place of the hardware depicted in FIG. 1A. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1A is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1B:
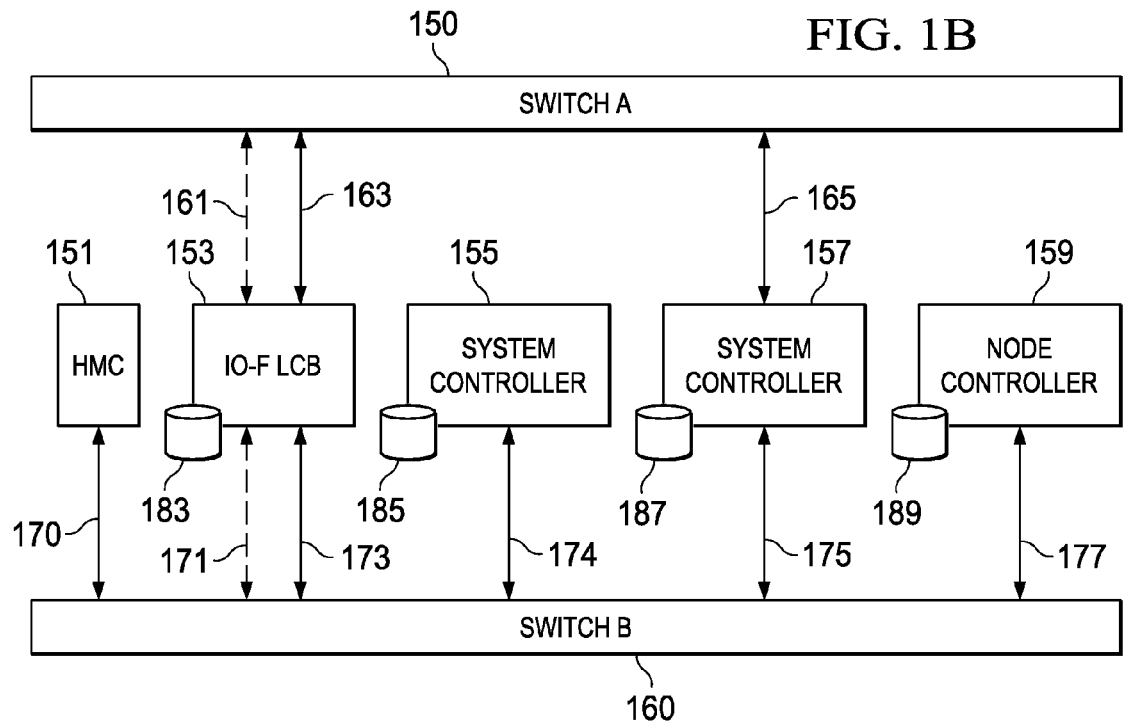
FIG. 1B is a network of computing nodes in accordance with an illustrative embodiment of the invention.

FIG. 1B is a network of computing nodes in accordance with an illustrative embodiment of the invention. A switch is a device configured to provide network connectivity between data processing systems such as Hardware Management Console (HMC) 151, Input/Output Frame Linux Companion Box (IO-F LCB) 153, System Controller 155, 157, and Node Controller 159. IO-F LCB 153 may rely on Stream Control Transmission Protocol (SCTP) messages 161, SCTP messages 163 to have local access to switch A 150. SCTP message structure is explained further below, in reference to FIG. 2. These SCTP messages may travel a common physical conduit between IO-F LCB 153 and switch A 150. System controller 157 may have SCTP messages 165 exchanged with switch A 150. Alternatively, system controller 157 may have SCTP messages 175 exchanged with switch B 160.

Data processing systems 151, 153, 155, 157, and 159 can be configured in the manner shown, for example, by data processing system 100, of FIG. 1A.

Switch B 160 may exchange several streams of SCTP messages, namely, SCTP messages 170 from HMC 151, SCTP messages 171 and SCTP messages 173 from IO-F LCB 153, SCTP messages 174 from system controller 155, SCTP messages 175 from system controller 157, SCTP messages 177 from node controller 159. Accordingly, switch B can arbitrate messages among HMC 151, IO-F LCB 153, system controller 155, system controller 157, and node controller 159. The switches, switch A and switch B, may be any conventional switch, for example, a router, a virtual local area network (VLAN) switch, and the like. Accordingly, one of ordinary skill in the art may select from any device that receives and forwards packets in accordance with an address described in a packet. Moreover, the switch is not limited to electrical signals. The switch may be an optical switch.

Each data processing system may rely on two physical conduits to obtain local access to a switch. For example, a first physical conduit may carry SCTP messages 165 to and from switch A 150, while a second physical conduit may carry SCTP messages 175 to and from switch B 160. A communication channel list is a data structure that describes at least a media access control (MAC) address and a network identifier for a channel, as defined by a channel identifier. A data processing system may keep a communication channel list locally in order to track a status for each physical conduit and/or the impact of a physical conduit's status on channels that rely on the physical conduit. Thus, data processing systems 151, 153, 155, 157, and 159, may store and retrieve data respectively in communication channel lists 183, 185, 187, and 189.

A switch or router is a data processing system configured with at least two networking ports so that a packet arriving on one port can be used to form a packet to transmit on a second port in a manner to reach a device having a destination address. The switch can translate an address of the arrived packet to an address in the transmitted packet or deliver the payload of the packet directly to the device defined by the destination address. A switch can be an InfiniBand® switch, a VLAN switch, or a router InfiniBand is a trademark of Cisco Systems, Inc. A redundant switch is a switch, relative to a first or primary switch, that, along with the first switch, is connected directly to the device. Each switch has a physical conduit distinct from the other switch. Each physical conduit carries carry communications of the device to one or the other switch.

A virtual local area network switch or VLAN is a routing network that provides segmentation services. For example, a VLAN can support security, network management as well as issues concerning scalability. VLAN implementations are described in the IEEE 802.1Q standard. Packets routed through a VLAN can include tags that provide integrity and routing to Ethernet frames, which can include a 12-bit VLAN identifier or VID.

The aspects of the illustrative embodiments provide a computer implemented method, data processing system, and computer program product for establishing a data structure of one or more redundant communication channels that support a session between at least two applications executing on at least two devices. In particular, an application running on one data processing system may rely on interrupt-driven hot standby program to respond to an apparent failure in one physical conduit used to access locally a switch. Such an interrupt-driven hot standby program may detect new channels, record attributes of such channels, and rely on the record to retry and reroute traffic of a session dependent on periodic redundancy of a channel. In short, through the operation of a redundant physical channel, applications using an embodiment can operate without gaps detectable by the application while communicating with a peer application on a peer data processing system. The interrupt-driven hot standby program can be implemented at the kernel level as a kernel extension. The kernel level or kernel space is virtual memory reserved for executing the kernel, kernel extensions, and some device drivers. A kernel is a software module that provides resource allocation, security and low-level hardware interfaces. A kernel can be found in Linux, Unix, and similar operating systems executing on a processor.

Figure 2:
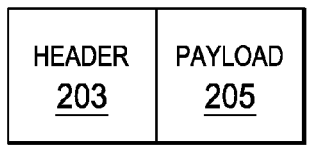
FIG. 2 is a Stream Control Transmission Protocol (SCTP) message in accordance with an illustrative embodiment of the invention.

FIG. 2 is a Stream Control Transmission Protocol (SCTP) message in accordance with an illustrative embodiment of the invention. A SCTP message includes at least header 203 and payload 205. The payload may be, for example, one or more encapsulated transmission protocol packets. A message, such as an SCTP message, is one or more transport protocol packets arranged as a payload to a unit of transmitted data, such that the payload is linked to a header to form the unit of transmitted data. SCTP message may be further defined in request for comments (RFC) 4960 and revised versions of the draft standard as published from time to time by the Internet Engineering Task Force. Header 203 can include a unique identifier that specifies a local access physical conduit, a switch, or both. An identifier is a unique number, string, selected from a set of numbers or strings such that for a corresponding instance of a hardware device or abstracted qualifier of the hardware device, the instance has a number or string distinct from any other number or string assigned the hardware device or abstracted qualifier. Traffic is the one or more messages of a channel for a device.

FIG. 3 is a software application stack configured in accordance with an illustrative embodiment of the invention. Software application stack 301 abstracts the one or more physical channels as session 311. Session 311 relies on physical resources 313 at the foundation of the data processing system. The data processing system can be, for example, any one of 151, 153, 155, 157, and 159 of FIG. 1B. Physical resources 313 can include any hardware depicted in FIG. 1A, as well as a physical conduit. Physical resources 313 may be receiving or transmitting SCTP messages 341, as shown in FIG. 2.

Above physical resources 313, an operating system may provide a kernel layer 309. Kernel layer 309 may include a SCTP layer. Above the kernel layer 309, interrupt-driven hot standby program 305 handles hardware interrupts and other servicing calls originating from messages and/or channels. An interrupt is an asynchronous event that interrupts normal processing. An interrupt may be caused by both hardware (I/O, timer, machine check) and software. Hardware interrupts include, for example, I/O, timers, and machine checks. Software interrupts can include, for example, system calls or trap instructions, among others. Kernel layer 309 provides interrupt 306 in response to activity of the channel. Interrupt-driven hot standby program 305, in turn, responds to interrupt 306 to provide correct handling of messages and channel activity. Further interrupts, for example, software interrupt 304, may arrive from application 303. An application is a program that generally performs a service for a user. Applications always run in user mode or non-privileged mode. In contrast, operating systems and kernels operate in a privileged mode.

A channel, such as the channel used by session 311, is a transmission protocol session established in response to a first device transmitting an initializing packet or message and a second device sending a packet acknowledging the initializing packet or message in return. Furthermore, the channel is arranged such that responsive to each packet or message that requests acknowledgment from the second device, a coordinating acknowledgement is received before a time-out period expires. Otherwise, the channel and supporting hardware can develop a secondary acknowledgement with a recovery protocol. A time-out or time-out period is a threshold time that elapses between a first event and a second event. When the second event fails to arrive within the threshold time, a time-out or time-out period has expired prior to the second event. In other words, a time-out has occurred with respect to the first event and the expected second event. In addition, the message and acknowledgements to the message travel a common local access conduit. An acknowledgement message is a message that is sent responsive to a first message being received at a data processing system. A redundant channel is a session that, relative to a first session, operates relying on a physical conduit that serves as a local access conduit independent from a local access conduit of the first channel. Each channel corresponds to a MAC address of a device. Accordingly, a first channel and a redundant channel each have distinct network identifiers with which to identify the physical conduit over which the respective channel's messages cross. As such, the network identifier serves as an attribute for a channel in a communication channel record stored in a communication channel list. An attribute is a qualifier that defines the nature of a data processing element. The data processing element can be hardware, software, or data stored within a data processing system.

Interrupt-driven hot standby program 305 can access communication channel list 321 in response to changes in status of each communication channel. A communication channel list is one or more records that define a channel and any redundant channels that support a common session with the channel. A record of communication channel list may comprise, channel identifier 323, media access control (MAC) address 325, and network identifier 327.

Figure 4A:
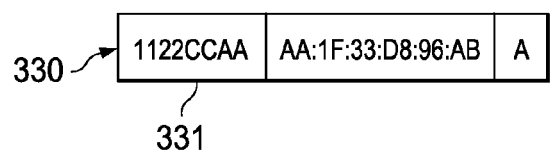
FIG. 4A is an initial configuration of a communication channel list in accordance with an illustrative embodiment of the invention.

FIG. 4A is an initial configuration of a communication channel list in accordance with an illustrative embodiment of the invention. The communication channel list comprises a single record 330. The record includes channel identifier 331. Channel identifier may correspond with a channel such as SCTP messages 165 of FIG. 1B.

Figure 4B:
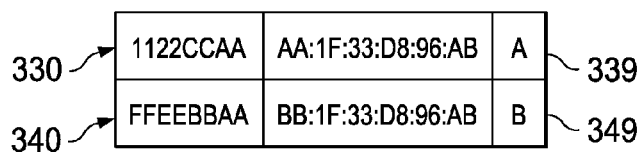
FIG. 4B is an updated configuration of a communication channel list in accordance with an illustrative embodiment of the invention.

FIG. 4B is an updated configuration of a communication channel list in accordance with an illustrative embodiment of the invention. In addition, to single record 330, as shown in FIG. 4A, the communication channel list includes redundant record 340. Redundant record 340 may correspond with a channel such as SCTP messages 175 of FIG. 1B. First channel is defined as single record 330 connecting to switch A, for example, using a field called switch attribute 339. Specific data for the switch attribute field can be, for example, "A". Redundant channel is defined as redundant record 340 connecting to switch B, for example, using switch attribute 349. Switch attribute 349 may be an identifier of the redundant switch, in this case switch B.

Figure 5A:
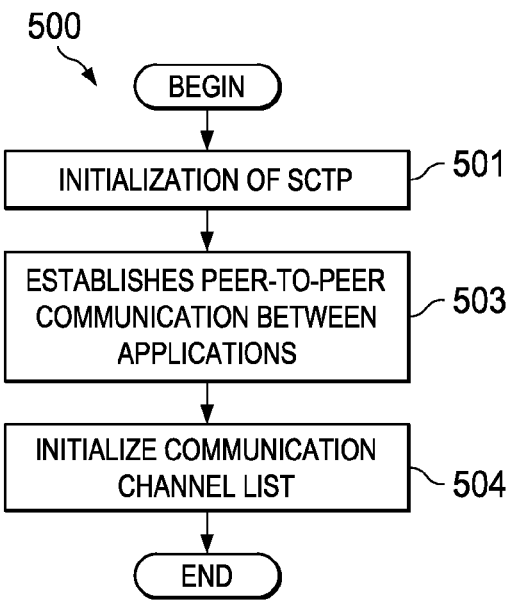
FIG. 5A is an initialization flowchart in accordance with an illustrative embodiment of the invention.

FIG. 5A is an initialization flowchart in accordance with an illustrative embodiment of the invention. The steps of flowchart 500 may be performed by interrupt-driven hot standby program 305 in response to being invoked by a corresponding application, such as application 303, both of FIG. 3. In this example, the interrupt-driven hot standby program initializes SCTP data structures (step 501). The data structures include those data structures normally established to maintain an SCTP channel.

Next, the interrupt-driven hot standby program establishes a peer-to-peer communication between applications (step 503). Next, the interrupt-driven hot standby program initializes the communication channel list (step 504). The communication list may hold the data as shown in FIGS. 4A and 4B. Processing may terminate thereafter.

Figure 5B:
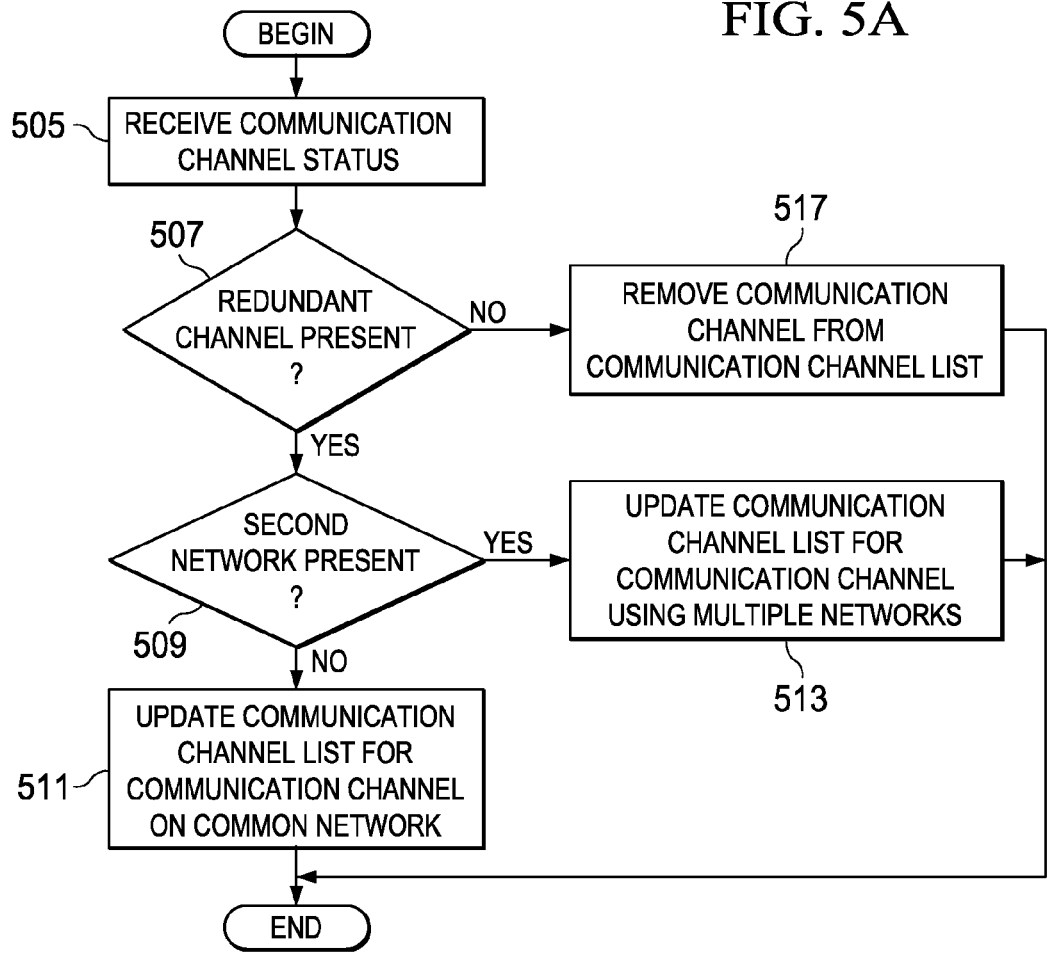
FIG. 5B is a flowchart showing how a communication channel list is updated in accordance with an illustrative embodiment of the invention.

FIG. 5B is a flowchart showing how a communication channel list is updated in accordance with an illustrative embodiment of the invention. The steps in FIG. 5B may be performed by interrupt-driven hot standby program executing on a data processing system. References herein to interrupt-driven hot standby program include the physical hardware that performs the instructions of interrupt-driven hot standby program. Initially, the interrupt-driven hot standby program may receive communication channel status (step 505). A communication channel status is a status of a session using a specified conduit and/or local access switch that indicates if a session is established between the first device and the second device. The communication status can, in part, be received as an interrupt to an application or an interrupt-driven hot standby program. The interrupt-driven hot standby program can be invoked by an application to which the interrupt is directed. Step 505 can include an underlying data processing system assigning physical resources to a thread that executes the instructions of interrupt-driven hot standby program. Next, the interrupt-driven hot standby program may determine whether a redundant channel is present (step 507).

In response to a negative determination at step 507, the interrupt-driven hot standby program may remove the communication channel from the communication channel list (step 517). Processing may terminate thereafter.

In response to a positive determination at step 507, the interrupt-driven hot standby program may determine if a second network is present (step 509). If not, the interrupt-driven hot standby program may update the communication channel list for communication channel on a common network (step 511). Processing may terminate thereafter. Alternatively, a positive determination at step 509 may result in the interrupt-driven hot standby program updating the communication channel list for a communication channel using multiple networks (step 513). Processing may terminate thereafter.

Figure 6:
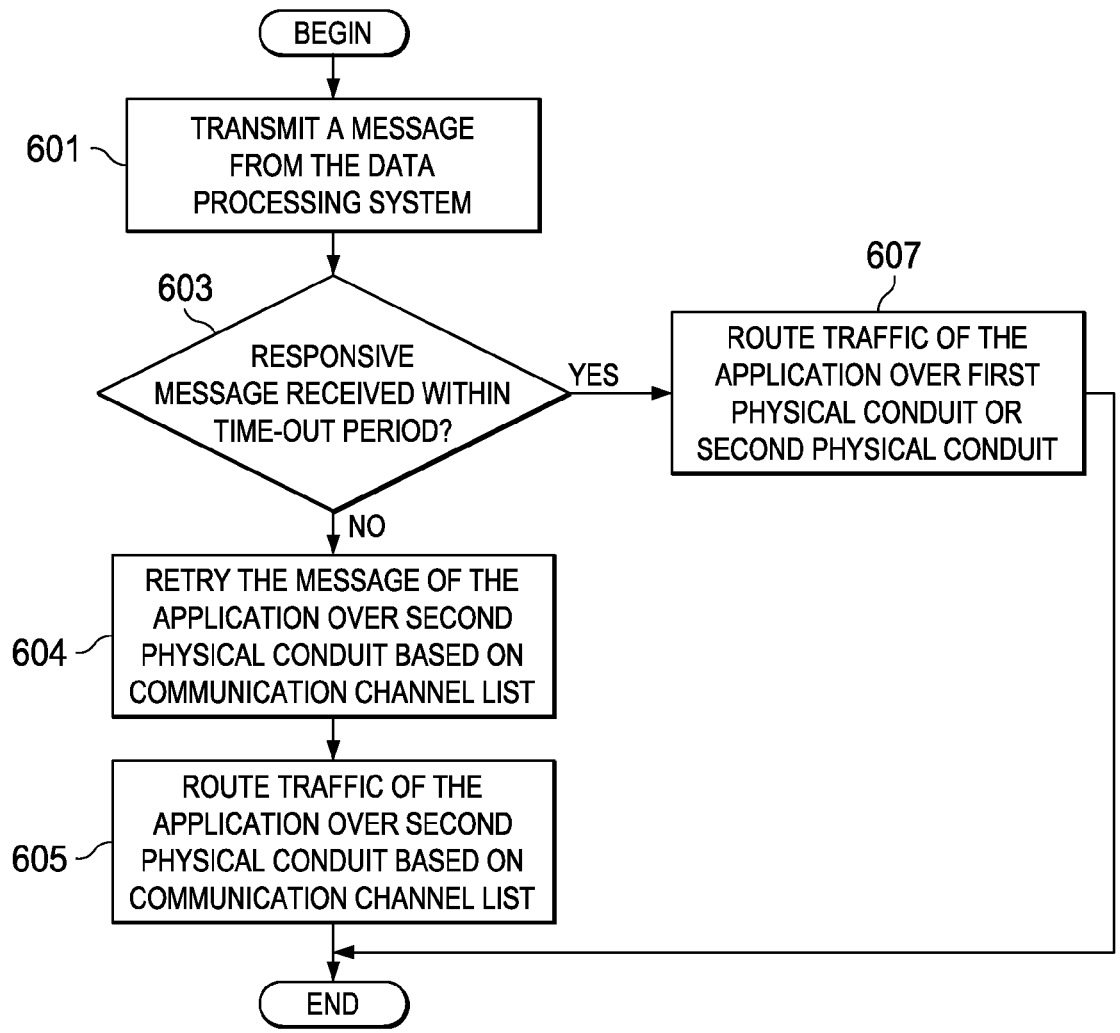
FIG. 6 is a flowchart of a process to recover a session from a time-out occurring on one of the physical conduits or downstream devices in accordance with an illustrative embodiment of the invention.

FIG. 6 is a flowchart of a process to recover a session from a time-out occurring on one of the physical conduits or downstream devices in accordance with an illustrative embodiment of the invention. Initially, the interrupt-driven hot standby program transmits a message from the data processing system (step 601). The message can be an SCTP message. Next, the interrupt-driven hot standby program may determine if a responsive message was received within a time-out period (step 603). In response to a positive determination, the interrupt-driven hot standby program may route traffic of the application over a first physical conduit or a second physical conduit (step 607).

Alternatively, a negative result to step 603 may cause the interrupt-driven hot standby program to retry the message of the application over a second physical conduit based on the communication channel list (step 604). When the interrupt-driven hot standby program (IDHSP) retries the message of the application, the interrupt-driven hot standby program sends a message, first sent on the first physical conduit, over the second physical conduit. Next, the interrupt-driven hot standby program may route traffic of the application over the second physical conduit based on the communication channel list (step 605). In other words, the second physical conduit may carry messages of the application in addition to the message that is retried. Following steps 605 and 607, processing may terminate.

The aspects of the illustrative embodiments provide a computer implemented method, data processing system, and computer program product for establishing a data structure of one or more redundant communication channels that support a session between at least two applications executing on at least two devices. In particular, an application running on one data processing system may rely on an interrupt-driven hot standby program to respond to an apparent failure in one physical conduit used to access a switch locally. Such an interrupt-driven hot standby program may detect new channels, record attributes of such channels, and rely on the record while retrying and rerouting to retry and reroute traffic of a session dependent on periodic redundancy of a channel. In short, through the operation of a redundant physical channel, applications using an embodiment can operate without gaps detectable to the application while communicating with a peer application on a peer data processing system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for establishing a redundant channel from an application to a peer data processing system, the computer implemented method comprising:

receiving, by a data processing system, a communication channel status corresponding to an application, wherein the application has a first channel using local access across a first physical conduit to a first switch, wherein the communication channel status is, in part, an interrupt;

determining whether the redundant channel is present, wherein the redundant channel is configured to use a second physical conduit distinct from the first physical conduit for traffic of the application;

responsive to a determination that the redundant channel is present, determining whether the redundant channel is configured to use the second physical conduit as local access to a redundant switch, wherein the redundant switch is not the first switch;

responsive to a determination that the redundant channel is configured to use the second physical conduit, updating a communication channel list to include at least one attribute of the redundant channel, wherein the communication channel list is resident in the data processing system;

responsive to a determination that the redundant channel is present, determining that the first channel is timed-out based on an acknowledgment message failing to arrive within a time-out period, wherein such a determination is performed by the data processing system at a kernel level; and responsive to a determination that the first channel is timed-out, routing traffic of the application over the second physical conduit based on the communication channel list.

2. The computer implemented method of claim 1, further comprising:

establishing the first channel used by the application using a first physical conduit as a local access conduit to a first switch, wherein the communication channel status corresponds to the first channel.

3. The computer implemented method of claim 1, wherein routing traffic of the application comprises retrying a message on the redundant channel.

4. The computer implemented method for of claim 1, wherein the at least one attribute of the redundant channel is an identifier of the redundant switch.

5. The computer implemented method for of claim 1, wherein the first switch is a primary virtual local area network (VLAN) switch, and the redundant switch is a secondary virtual local area network switch.

6. The computer implemented method of claim 1, further comprising:

initializing a kernel having a stream control transmission protocol kernel extension.

7. A computer program product for establishing a redundant channel from an application to a peer data processing system, the computer program product comprising a non-transitory computer-usable medium having computer-usable program code embodied therewith, said computer-usable program, when executed by a data processing system, causes said data processing system to perform a method comprising:

receiving, by said data processing system, a communication channel status corresponding to an application, wherein the application has a first channel using local access across a first physical conduit to a first switch, wherein the communication channel status is, in part, an interrupt;

determining whether the redundant channel is present, wherein the redundant channel is configured to use a second physical conduit distinct from the first physical conduit for traffic of the application;

determining whether the redundant channel is configured to use the second physical conduit as local access to a redundant switch, wherein the redundant switch is not the first switch, responsive to a determination that the redundant channel is present;

updating a communication channel list to include at least one attribute of the redundant channel, wherein the communication channel list is resident in the data processing system, responsive to a determination that the redundant channel is configured to use the second physical conduit;

determining that the first channel is timed-out based on an acknowledgment message failing to arrive within a time-out period, wherein such a determination is performed by the data processing system at a kernel level, responsive to a determination that the redundant channel is present; and routing traffic of the application over the second physical conduit based on the communication channel list, responsive to a determination that the first channel is timed-out.

8. The computer program product of claim 7, said method further comprising:

establishing the first channel used by the application using a first physical conduit as a local access conduit to a first switch, wherein the communication channel status corresponds to the first channel.

9. The computer program product of claim 7, wherein routing traffic of the application comprises retrying a message on the redundant channel.

10. The computer program product for of claim 7, wherein the at least one attribute of the redundant channel is an identifier of the redundant switch.

11. The computer program product for of claim 7, wherein the first switch is a primary virtual local area network (VLAN) switch, and the redundant switch is a secondary virtual local area network switch.

12. The computer program product of claim 7, said method further comprising:

initializing a kernel having a stream control transmission protocol kernel extension.

13. A data processing system comprising:

a bus;

a storage device connected to the bus, wherein computer usable code is located in the storage device;

a communication unit connected to the bus; and a processing unit connected to the bus, wherein the processing unit executes the computer usable code for establishing a redundant channel from an application to a peer data processing system, wherein the processor executes computer usable code to receive, by a data processing system, a communication channel status corresponding to an application, wherein the application has a first channel using local access across a first physical conduit to a first switch, wherein the communication channel status is, in part, an interrupt;

determine whether the redundant channel is present, wherein the redundant channel is configured to use a second physical conduit distinct from the first physical conduit for traffic of the application;

determine whether the redundant channel is configured to use the second physical conduit as local access to a redundant switch, wherein the redundant switch is not the first switch, responsive to a determination that the redundant channel is present;

update a communication channel list to include at least one attribute of the redundant channel, wherein the communication channel list is resident in the data processing system, responsive to a determination that the redundant channel is configured to use the second physical conduit;

wherein the processor further executes computer usable code to determine that the first channel is timed-out based on an acknowledgment message failing to arrive within a time-out period, wherein such a determination is performed by the data processing system at a kernel level, responsive to a determination that the redundant channel is present; and rout traffic of the application over the second physical conduit based on the communication channel list, responsive to a determination that the first channel is timed-out.

14. The data processing system claim 13, wherein the processor further executes computer usable code to establish the first channel used by the application using a first physical conduit as a local access conduit to a first switch, wherein the communication channel status corresponds to the first channel.

15. The data processing system claim 13, wherein routing traffic of the application comprises retrying a message on the redundant channel.

16. The data processing system of claim 13, wherein the at least one attribute of the redundant channel is an identifier of the redundant switch.

17. The data processing system of claim 13, wherein the first switch is a primary virtual local area network (VLAN) switch, and the redundant switch is a secondary virtual local area network switch.

18. The data processing system claim 13, wherein the processor further executes computer usable code to initialize a kernel having a stream control transmission protocol kernel extension.

* * * * *